United States Patent Office 2,837,377
Patented June 3, 1958

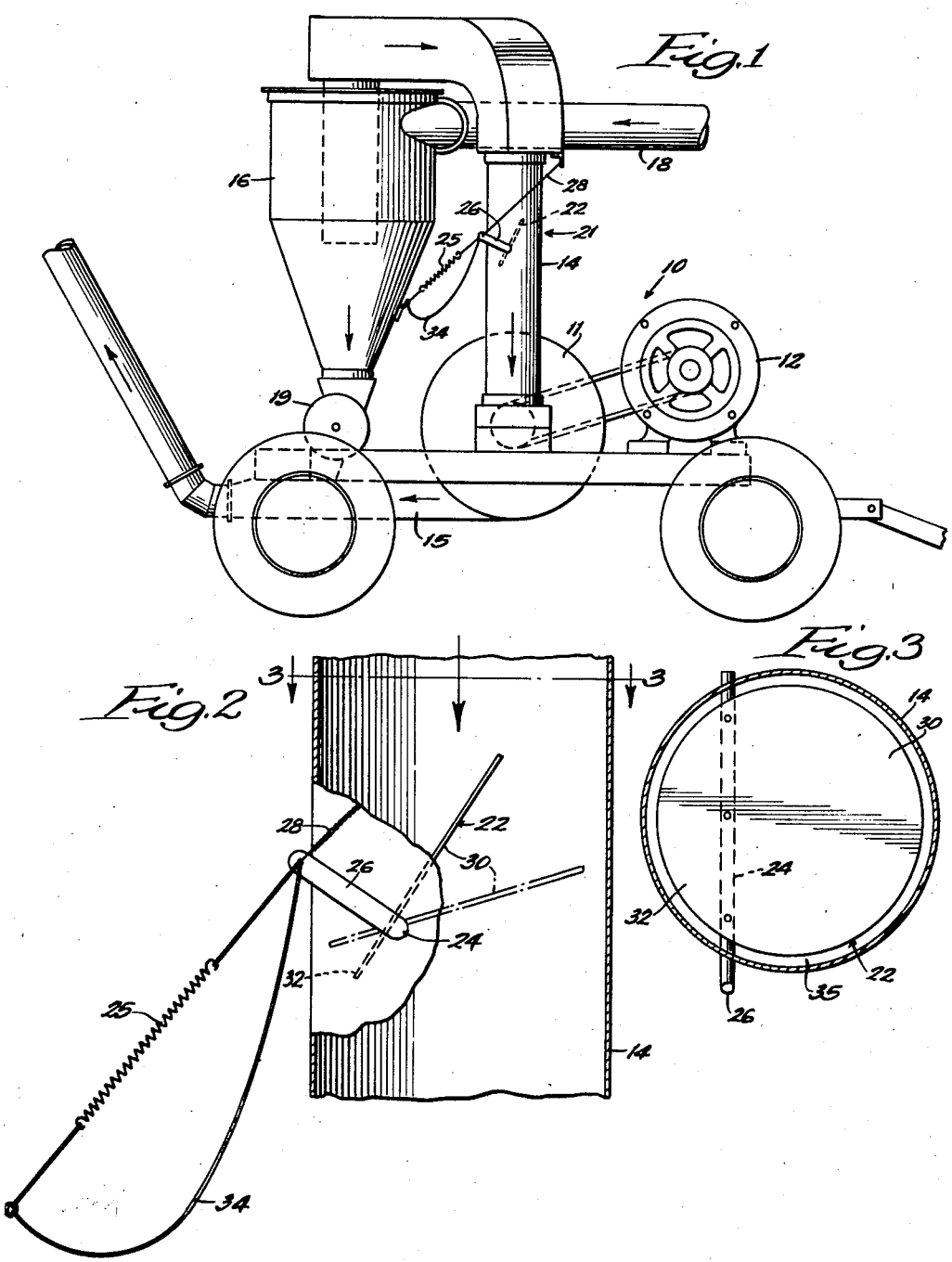

2,837,377

AUTOMATIC REGULATING DEVICE FOR PNEUMATIC CONVEYORS

James F. Finnegan, Aurora, Ill., assignor to Dunbar Kapple, Inc., Geneva, Ill., a corporation of Illinois Application July 6, 1954, Serial No. 441,270

2 Claims. (Cl. 302—23)

This invention relates to conveyors for moving loose materials in an entraining air stream. More particularly, the invention pertains to automatic regulating apparatus for limiting the quantity of air moved by the pneumatic conveyor and thereby preventing overload conditions.

One principal object of the invention is to provide an improved power driven pneumtic conveyor having a regulating device for automatically limiting the amount of air moved by the conveyor and thereby preventing the motor utilized to drive the conveyor from being overloaded.

A further object is to provide an automatic regulating device which will be effective to limit the flow of air through the conveyor when the intake or suction conduit of the conveyor is removed from the source of loose material and air alone is thus being moved by the conveyor.

It is another object of the invention to provide a regulating device which will offer no substantial resistance to the flow of air through the conveyor when loose material is being conveyed, but which will substantially limit the flow of air when air alone is being moved.

Another object is to provide a regulating device which will afford no substantial resistance to the flow of air through the conveyor when the intake or suction conduit of the conveyor is in contact with the supply of loose material and the air intake is thereby limited by the obstruction afforded by the loose material, but which will limit the flow of air when the intake conduit is opened to the atmosphere by being withdrawn from the source of loose material.

Further objects and advantages of the invention will appear from the following description, taken with the accompanying drawing, in which:

Figure 1 is a general side elevational view of an illustrative embodiment of the invention, in the form of an exemplary pneumatic conveyor;

Fig. 2 is an enlarged elevational view, partly in section, of an automatic air flow regulating device embodied in the conveyor of Fig. 1; and Fig. 3 is a horizontal sectional view taken generally along a line 3—3 in Fig. 2.

Considered in greater detail, Fig. 1 illustrates a pneumatic conveyor 10 which may advantageously be employed for transferring grain or other loose material from place to place. Many of the details of the conveyor 10 form no part of the present invention, but it will be of general interest to note that the illustrated conveyor 10 comprises a fan or blower 11 driven in this instance by an electric motor 12 which, for example, may be a single- or three-phase alternating current induction motor. The fan 11 is adapted to take in a large volume of air through an inlet pipe 14 and to discharge the air through an outlet pipe 15. In order to prevent the passage of loose material through the fan 11, the intake pipe 14 is connected to a cyclonic separator 16 adapted to remove the loose material from the incoming air stream, which enters the separator through a suction pipe 18.

When it is desired to convey loose material, the suction pipe 18 is thrust into or otherwise engaged with a pile or other supply of the material so that air entering the suction pipe will entrain the loose material and carry it to the separator 16. In the separator, the grain or other material moves downwardly along a spiral path. The entrained air moves upwardly into the intake pipe 14 and thence to the fan 11. At the lower end of the separator 16 a power driven rotary transfer valve 19 is provided to convey the loose material from the low pressure zone in the lower end of the separator 16 to the high pressure zone in the outlet pipe 15. In this way the grain or other material is reintroduced into the outgoing air stream.

If the suction pipe 18 is removed from the supply of loose material, the resistance normally afforded by the loose material is eliminated and the suction pipe is opened directly to the atmosphere. Accordingly, the air intake is no longer limited by the loose material and, hence, tends to increase substantially. When the fan 11 is being driven by an alternating current induction motor or some other motor operating at substantially constant speed or at least having good speed regulation, the power required to operate the fan 11 is increased greatly because of the increased volume of air being moved. For example, the power required to operate the fan with the suction pipe 18 open may be nearly twice the power required when the suction pipe is thrust into a supply pile of grain or other loose material. This increase in the required driving power will tend to overload the motor and may cause the motor to overheat or may result in blowing of fuses or other circuit interrupting devices. This overloading of the motor is usually less acute when the fan is driven by an internal combustion engine, because the reserve power of such an engine is usually greater than that of an electric motor, and also because the ordinary internal combustion engine has relatively poor speed regulation and, hence, slows down considerably when the increased load is imposed on the engine. This slowing down automatically reduces the volume of air moved by the fan 11. However, if the internal combustion drive motor is equipped with a constant speed governor, the engine may be overloaded seriously when the suction pipe 18 is opened to the atmosphere.

In accordance with the invention, an automatic regulating device 21 is embodied in the pneumatic conveyor 10 to limit the flow of air into the fan 11 and thereby prevent the fan from overloading the motor 12. In the illustrative arrangement shown in the drawing, the regulating device 21 includes a valve member in the exemplary form of a damper plate 22 positioned in the fan intake pipe 14. The damper 22 is mounted on a shaft 24 journaled in the walls of the pipe and is movable between the full and dotted line positions shown in Fig. 2. In its full line position, the damper plate 22 does not afford any objectionable resistance to the flow of air through the intake pipe 14. During normal operation, when loose material is being handled by the conveyor 10, the damper plate 22 is held in this substantially open position by suitable yieldable biasing means, which might comprise a weight but is illustrated as comprising an extension spring 25 having one end anchored to a suitable point and the other end connected to an arm 26 extending radially from the shaft 24. Stop means are employed to limit the swinging movement of the damper plate 22 under the force of the spring 25 and thus to define the substantially open, full line position of the plate 22. In this instance, the stop means take the form of a chain 28 or other flexible line connected between the arm 26 and a suitable anchoring point.

In order that the damper valve 22 may automatically move to its nearly closed, dotted line position shown in Fig. 2, the damper valve is provided with an asymmetrical element or portion adapted to be acted upon by the force of the air stream in the intake pipe 14 and to utilize this force for swinging the valve against the yieldable resistance of the spring 25. In this instance the shaft 24 is connected eccentrically to the damper plate 22 and is mounted off-center in the pipe 14 so as to afford a relatively large portion 30 of the plate on one side of the shaft 24 and a relatively small portion 32 on the opposite side. The relatively extensive portion 30 is acted upon to a greater extent by the force of the air stream than is the smaller portion 32, with the result that the air stream tends to swing the valve plate 22 to its nearly closed, dotted line position. During normal operation, however, when grain or other material is being handled, the force of the air stream is insufficient to overcome the force of the biasing means 25 and the damper plate 22 accordingly remains in its full line position. When the suction pipe 18 is withdrawn from the supply of grain and thus opened to the atmosphere, the flow of air in the pipe 14 increases to such an extent that the force of the air stream swings the damper plate 22 to its dotted line position. This nearly closed position is defined by a stop element in the form of a chain 34 or other flexible line, which limits the movement of the plate 22. The chain 34 is connected between the arm 26 and a suitable anchoring point.

In its nearly closed, dotted line position, the damper valve plate 22 does not entirely cut off the flow of air through the pipe 14. In fact, the plate 22 is preferably made somewhat smaller than the pipe 14 so that an annular leakage opening 35 will always be present around the plate to permit passage of air. Likewise, the chain 34 may be adjusted in length so that the plate 22 is arrested short of its most nearly closed position, as indicated in Fig. 2. The effect of the valve plate 22 when nearly closed is to limit the flow of air to a value comparable with the normal value existing when material is being handled. In this way the motor 12 will not be seriously overloaded.

When the suction pipe 18 is again brought into engagement with the supply of grain or other material, the restriction afforded by the grain substantially reduces the intake of air into the suction pipe. Likewise, the flow of air in the fan intake pipe 14 is correspondingly reduced. The force of the air stream on the valve plate 22 is thus reduced to such an extent that the biasing spring 25 returns the valve plate 22 to its nearly open, full line position. As long as grain is being handled, the damper plate 22 remains in this position and, hence, offers no substantial resistance to the flow of air into the fan 11. One advantage of the chains 28 and 34 is that they may be adjusted in length to vary the open and closed positions of the damper plate 22. In this way, the opening and closing of the damper plate may be made to occur at various rates of flow of air through the pipe 14. The action of the damper 22 may also be adjusted by varying the strength of the biasing means 25. Accordingly, the regulating device 21 may be adjusted to suit various operating conditions.

Various modifications, equivalents, and alternative constructions may be employed without departing from the true spirit and scope of the invention as set forth in the drawing and foregoing specification, and as defined in the following appended claims.

We claim:

1. In a pneumatic conveyor having a fan for developing an air stream to convey loose material, a motor for driving said fan, a separator for separating the loose material from the air stream, a suction pipe connected to said separator for receiving loose material and entraining air, an inlet air pipe connected between said separator and said fan, an outlet pipe connected to said fan, and means for transferring the loose material from said separator to said outlet pipe so as to bypass the material around said fan, apparatus for preventing said motor from being overloaded by said fan when said suction pipe is removed from the source of the loose material, said apparatus comprising a valve member, means asymmetrically mounting said member in said inlet air pipe for swinging movement between generally open and nearly closed positions so that the force of the air stream in said inlet pipe will tend to swing said valve member to said nearly closed position, yieldable means for biasing said valve member toward said generally open position and thereby normally restraining movement of said valve member to said nearly closed position, the force of said air stream overcoming said yieldable means and thereby effecting such closing movement when the flow of air in said inlet pipe increases above a predetermined normal value, said valve member when in said nearly closed position restricting air flow in said inlet pipe to a value comparable to said normal value, said yieldable means again opening said valve member when the flow of air in said inlet pipe decreases to a predetermined extent.

2. In a pneumatic conveyor having a fan for developing an air stream to convey loose material, a motor for driving said fan, a separator for separating the loose material from the air stream, a suction pipe connected to said separator for receiving loose material and entraining air, an inlet air pipe connected between said separator and said fan, an outlet pipe connected to said fan, and means for transferring the loose material from said separator to said outlet pipe so as to bypass the material around said fan, apparatus for preventing said motor from being overloaded by said fan when said suction pipe is removed from the source of the loose material, said apparatus comprising a damper valve member swingably mounted in said inlet air pipe for movement between generally open and nearly closed positions, asymmetrically disposed means on said valve member for receiving the force of the air stream in said inlet pipe and for utilizing said force to swing said valve member to said nearly closed position, yieldable means for biasing said valve member toward said generally open position and thereby normally restraining movement of said valve member to said nearly closed position, the force of said air stream overcoming said yieldable means and thereby effecting such closing movement when the flow of air in said inlet pipe increases above normal due to removal of said suction pipe from the source of loose material, said valve member when in said nearly closed position restricting air flow in said inlet pipe to a value comparable to the normal value, said yieldable means again opening said valve member when the flow of air in said inlet pipe decreases due to insertion of said suction pipe into the supply of loose material.

References Cited in the file of this patent

UNITED STATES PATENTS

| 426,649 | Smith | Apr. 29, 1890 |
| 539,325 | Zedler et al. | May 14, 1895 |
| 717,642 | Wade | Jan. 6, 1903 |
| 850,716 | Andrews | Apr. 16, 1907 |
| 1,494,996 | Crawford | May 20, 1924 |
| 2,512,211 | Minniear | June 20, 1950 |

FOREIGN PATENTS

| 684,810 | Great Britain | Jan. 13, 1950 |
| 1,066,660 | France | Nov. 18, 1952 |